United States Patent
Kim et al.

(10) Patent No.: US 9,855,616 B2
(45) Date of Patent: Jan. 2, 2018

(54) CONTROL DEVICE FOR WIRE ELECTRIC DISCHARGE MACHINE AND CONTROL METHOD FOR WIRE ELECTRIC DISCHARGE MACHINE

(71) Applicant: Mitsubishi Electric Corporation, Chiyoda-ku, Tokyo (JP)

(72) Inventors: Ieyoung Kim, Tokyo (JP); Takayuki Nakagawa, Tokyo (JP); Daisuke Sekimoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/124,468

(22) PCT Filed: Mar. 27, 2014

(86) PCT No.: PCT/JP2014/001792
§ 371 (c)(1),
(2) Date: Sep. 8, 2016

(87) PCT Pub. No.: WO2015/145484
PCT Pub. Date: Oct. 1, 2015

(65) Prior Publication Data
US 2017/0014926 A1    Jan. 19, 2017

(51) Int. Cl.
*B23H 7/00* (2006.01)
*B23H 1/02* (2006.01)
(Continued)

(52) U.S. Cl.
CPC ............... *B23H 1/02* (2013.01); *B23H 7/04* (2013.01); *B23H 7/18* (2013.01)

(58) Field of Classification Search
CPC ............... B23H 1/02; B23H 7/18; B23H 7/04
(Continued)

(56) References Cited

U.S. PATENT DOCUMENTS 5,021,622 A * 6/1991 Magara ............... B23H 7/065
219/69.12
5,919,380 A * 7/1999 Magara ............... B23H 7/065
219/69.16
(Continued)

FOREIGN PATENT DOCUMENTS

EP    2 327 498 A2    6/2011
JP    1-501051 A    4/1989
(Continued)

OTHER PUBLICATIONS

Written Opinion dated Jul. 1, 2014 issued by International Searching Authority in counterpart International Application No. PCT/JP2014/001792 (PCT/ISA/237).
(Continued)

*Primary Examiner* — Thien S Tran
(74) *Attorney, Agent, or Firm* — Sughrue Mion, PLLC; Richard C. Turner

(57) ABSTRACT

A control device includes an interpolar average machining voltage detection unit that detects an interpolar average machining voltage between an electrode and a workpiece, an interpolar average machining voltage correction unit that corrects the detected interpolar average machining voltage, a machining speed control unit that calculates a machining speed of the electrode based on the difference between the set voltage, which is set in advance as a target value of the interpolar average machining voltage, and the corrected interpolar average machining voltage, and a drive control device that controls a machining speed of the electrode based on the calculated machining speed. The interpolar average machining voltage correction unit corrects the detected interpolar average machining voltage based on a difference between the calculated machining speed and the
(Continued)

set speed, which is set in advance as a target value of the machining speed.

7 Claims, 11 Drawing Sheets

(51) Int. Cl.
  *B23H 7/04* (2006.01)
  *B23H 7/18* (2006.01)
(58) Field of Classification Search
  USPC .......................... 219/69.12, 69.13; 700/162
  See application file for complete search history.

(56) References Cited

U.S. PATENT DOCUMENTS 6,998,562 B2 * 2/2006 Arakawa ................. B23H 7/04
  219/69.12
2003/0098293 A1 * 5/2003 Sato ........................ B23H 7/04
  219/69.12
2003/0098294 A1 * 5/2003 Goto ...................... B23H 7/065
  219/69.12
2004/0193306 A1 * 9/2004 Kurihara .................. B23H 7/20
  700/162

FOREIGN PATENT DOCUMENTS

| | | |
|---|---|---|
| JP | 10-138048 A | 5/1998 |
| JP | 11-207526 A | 8/1999 |
| JP | 2003-205426 A | 7/2003 |
| JP | 2011-110649 A | 6/2011 |
| JP | 2011-183515 A | 9/2011 |
| JP | 2012-166323 A | 9/2012 |

OTHER PUBLICATIONS

International Search Report dated Jul. 1, 2014 issued by International Searching Authority in counterpart International Application No. PCT/JP2 014/0017 92 (PCT/ISA/210).

* cited by examiner

: MACHINING AMOUNT FOR SHAPE CORRECTION

MEASURED VALUE OF INTERPOLAR AVERAGE VOLTAGE

CONTROL DEVICE FOR WIRE ELECTRIC DISCHARGE MACHINE AND CONTROL METHOD FOR WIRE ELECTRIC DISCHARGE MACHINE

TECHNICAL FIELD

The present invention relates to a control device for a wire electric discharge machine and a control method for a wire electric discharge machine.

BACKGROUND ART

An electric discharge machining apparatus is an apparatus for generating arc discharge between a machining electrode and a workpiece to be machined (between poles) to thereby machine the workpiece. The electric discharge machining apparatus requires an electric power source for generating discharge between the poles. When a high voltage is applied between the poles or when the distance between the poles is shortened to increase the field intensity, discharge is generated due to breakdown of insulation so that removal machining can be performed on the workpiece. When performing discharge again after the termination of the discharge and the recovery of insulation, since the distance between the poles is wide, it is necessary to apply a high voltage between the poles or to make the distance between the poles narrow to increase the field intensity.

In addition, when the discharge machining apparatus is used for machining, machining is repeated several times while changing machining conditions in accordance with a target of accuracy as to dimensions and surface roughness. A step of machining a workpiece into a target shape (first machining, which will be referred to as 1st machining) is performed first. After that, a step of increasing the shape accuracy and reducing the surface roughness in accordance with the target (shape correction machining) is performed.

In the 1st step of such machining, increase in speed is required in order to increase productivity. In the process of supplying high energy for high-speed machining, there occurs a deviation between a machining shape and a target shape. Possible reasons for this include increase in liquid spray pressure to prevent disconnection during the high-speed machining, fluctuation in wire tension in each time of machining, occurrence of strain in the workpiece due to residual stress generated during machining, etc. In this manner, in the 1st machining, there arises a problem that the shape of a machined workpiece deviates from its target shape due to occurrence of random motion of the machining electrode during machining or unexpected expansion/contraction of the workpiece. Therefore, a step of correcting the shape is required after the 1st machining.

In the shape correction machining, it is required to increase the accuracy of surface roughness while correcting the shape deviation generated in the 1st machining. However, how the shape has deviated with respect to a machining advancement direction in the 1st machining depends on the shape of a machining sample, the machining advancement direction, the machining conditions, etc. In the shape correction machining, it is required to have an ability to machine a workpiece in conformation to target dimensions even when a machining amount with which the workpiece should be corrected varies in each machining place or each direction to the machining advancement direction. When the shape cannot be corrected in conformation to the target dimensions in the shape correction machining, the distance between the poles varies depending on the machining place. Thus, it is likely that the variation in surface roughness increases.

Therefore, a control method in which an interpolar average machining voltage is monitored as means for detecting the machining state during discharge machining, and a relative moving speed is controlled to make the interpolar average machining voltage consistent with a set voltage is generally used in order to improve the faculty to correct the shape.

CITATION LIST

Patent Literature

Patent Literature 1: JP-A-2011-110649 (Pages 6 and 7, and FIGS. 1 and 2)
Patent Literature 2: JP-A-H10-138048 (Page 2, and FIG. 1)

SUMMARY OF THE INVENTION

Problem that the Invention is to Solve

However, the machining amount in the shape correction machining depends on the degree left in the previous step of machining the workpiece. The machining amount is not always constant even within a single machining shape. In fact, the machining amount varies in accordance with a machined surface (X+, Y+, X−, Y−), depending on the structure of the machine, the pressure of machining liquid, and the strain of the workpiece to be machined. FIG. 1 is a view showing a state in which the machining amount in the shape correction machining varies in accordance with the shape of a workpiece subjected to the 1st machining. The broken line designates a set shape in the 1st machining (a target shape programmed for the 1st machining); the solid line designates a real shape after the 1st machining; and the alternate long and short dash line designates a set shape in the shape correction machining (a target shape programmed for the shape correction machining). The machining amount in the shape correction machining increases or decreases in accordance with the deviation from the set shape in the 1st machining. Therefore, there is a problem that machining cannot be performed in conformation to intended dimensions even when a conventional control method in which a machining speed is controlled to make a measured average voltage consistent with a set voltage is used in the shape correction machining.

Therefore, as reasons why the conventional control method provides insufficient control to the shape correction machining, the present inventor et al. thought two reasons unique to the shape correction machining. One of the two reasons is that the difference between a side gap and a front gap cannot be quite measured only by an interpolar average machining voltage during machining. Here, the front gap is a distance between a machining electrode and a workpiece to be machined. The front gap is generated by discharge performed in the advancement direction of the machining electrode. On the other hand, the side gap is a distance between the machining electrode and the workpiece, which is generated in a direction perpendicular to the machining advancement direction. Shape correction as an essential part in the shape correction machining is to make the side gap constant. FIG. 2 is a view showing the positional relationship between a machining electrode and a workpiece to be machined, and definitions of the front gap and the side gap.

Although the fact that discharge has occurred can be monitored by the interpolar average machining voltage, where the discharge has occurred cannot be known. In fact, as a result of experiments carried out this time, it has been proved that the side gap cannot be made constant due to some machining speed even if machining is carried out to make the interpolar average machining voltage constant. Thus, it has been proved that simple control for making the interpolar average machining voltage constant is insufficient in order to improve accuracy in the shape correction machining.

A phenomenon that a discharge gap designating a discharging range becomes large with time is the second possible reason of insufficiency in the conventional control method. Here, the discharge gap may be interpreted as such a distance that discharge can be generated between the machining electrode and the workpiece to be machined. The enlargement of the discharge gap is a phenomenon that the distance to the workpiece increases with time when discharge is performed in the state where the machining electrode is made sufficiently close to the workpiece without short-circuiting to the workpiece. The distance between the poles in which discharge can be generated is several tens of micrometers or shorter. The discharge gap is increased up to several micrometers at one time of discharge. The positional relationship between the machining electrode and the workpiece in the shape correction machining is shown in FIG. 2. Assume that the machining electrode is moving relatively to the workpiece. In this case, when the speed is high, machining advances before the side gap is increased. On the contrary, when the speed is low, machining advances while the side gap is increased up to the vicinity of the longest value of the distance between the poles in which discharge can be generated. The conventional control method is insufficient to make the side gap constant because there is no consideration about the enlargement of the discharge gap.

For example, according to Patent Literature 1, a table of correction coefficients corresponding to machining conditions (the diameter of a machining electrode, the material of a workpiece to be machined, and the thickness of the workpiece) is provided in the method in which a relative moving speed between the machining electrode and the workpiece is controlled to make the interpolar average machining voltage between the machining electrode and the workpiece reach a set voltage. The average interpolar machining voltage is corrected using a correction coefficient. That is, the interpolar average machining voltage is corrected by increase or decrease of a constant correction value using a constant coefficient. Therefore, a constant correction value is provided for one machining condition.

On the other hand, Patent Literature 2 has proposed a technique in which an interpolar average machining voltage value is corrected to improve reproducibility of machining accuracy under the same conditions among a plurality of devices having the same configuration. A voltage is applied between an electrode and a workpiece to be machined, and an average open voltage in an open state is measured. A correction value of an interpolar average machining voltage value is set based on a predetermined reference voltage value. In the control according to Patent Literature 2, the interpolar average machining voltage value measured during machining is corrected with the correction coefficient, and relative moving speed is controlled to obtain a set voltage.

However, Patent Literatures 1 and 2 suggest methods in which correction is performed uniformly based on a result of machining in advance. According to such a method, only a constant correction value is provided for machining one machining shape. Therefore, there is a problem that the shape cannot be corrected in accordance with a variation in machining amount appearing within one machining shape.

The present invention has been developed in order to solve the foregoing problem. An object of the invention is to obtain a wire discharge machine in which a machining state is detected during machining, and at least one of a set voltage and an interpolar average machining voltage is corrected to make a side gap constant in accordance with the detected state, so that the machining accuracy can be improved.

Means for Solving the Problem

According to a control device for a wire discharge machine of the invention, in the wire discharge machine including the control device that controls a machining speed in accordance with a difference between a set voltage and an interpolar average machining voltage, the control device control device corrects at least one of the set voltage and the interpolar average machining voltage in accordance with a change in the machining speed.

Advantage of the Invention

According to the invention, at least one of a set voltage and an interpolar average machining voltage is corrected in accordance with a difference between a machining speed calculated by a machining speed control unit and a set speed set in advance. Accordingly, a side gap can be made constant, so that the machining accuracy can be improved.

MODE FOR CARRYING OUT THE INVENTION

Embodiment 1

Figure 1:
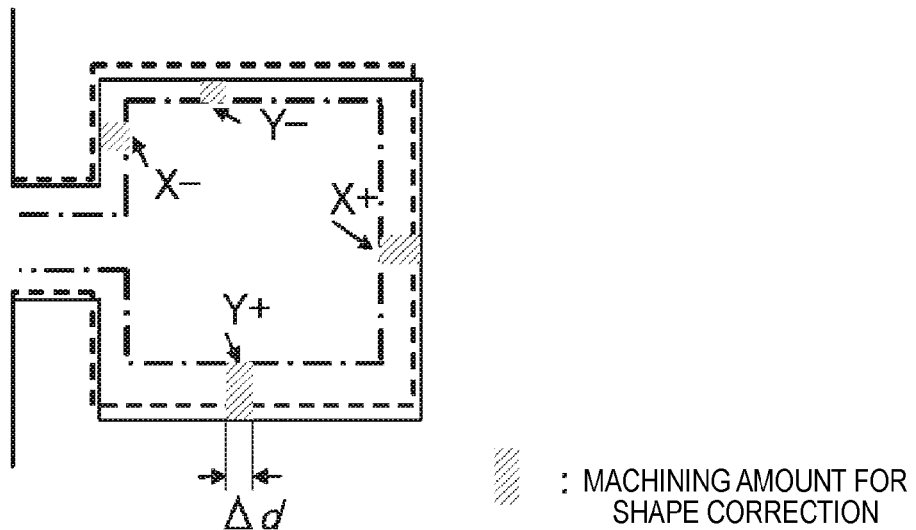
FIG. 1 A view showing a state in which the machining amount in shape correction machining varies in accordance with the shape of a workpiece subjected to 1st machining.
Figure 2:
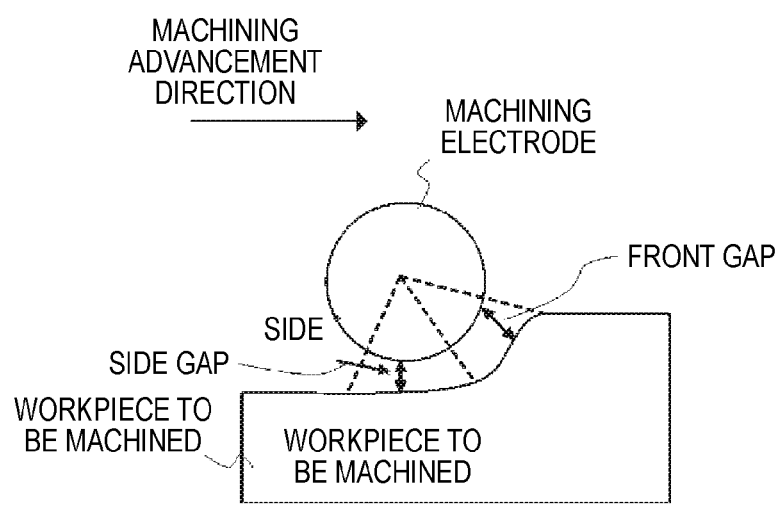
FIG. 2 A view showing the positional relationship between a machining electrode and a workpiece to be machined, and definitions of a front gap and a side gap.
Figure 3:
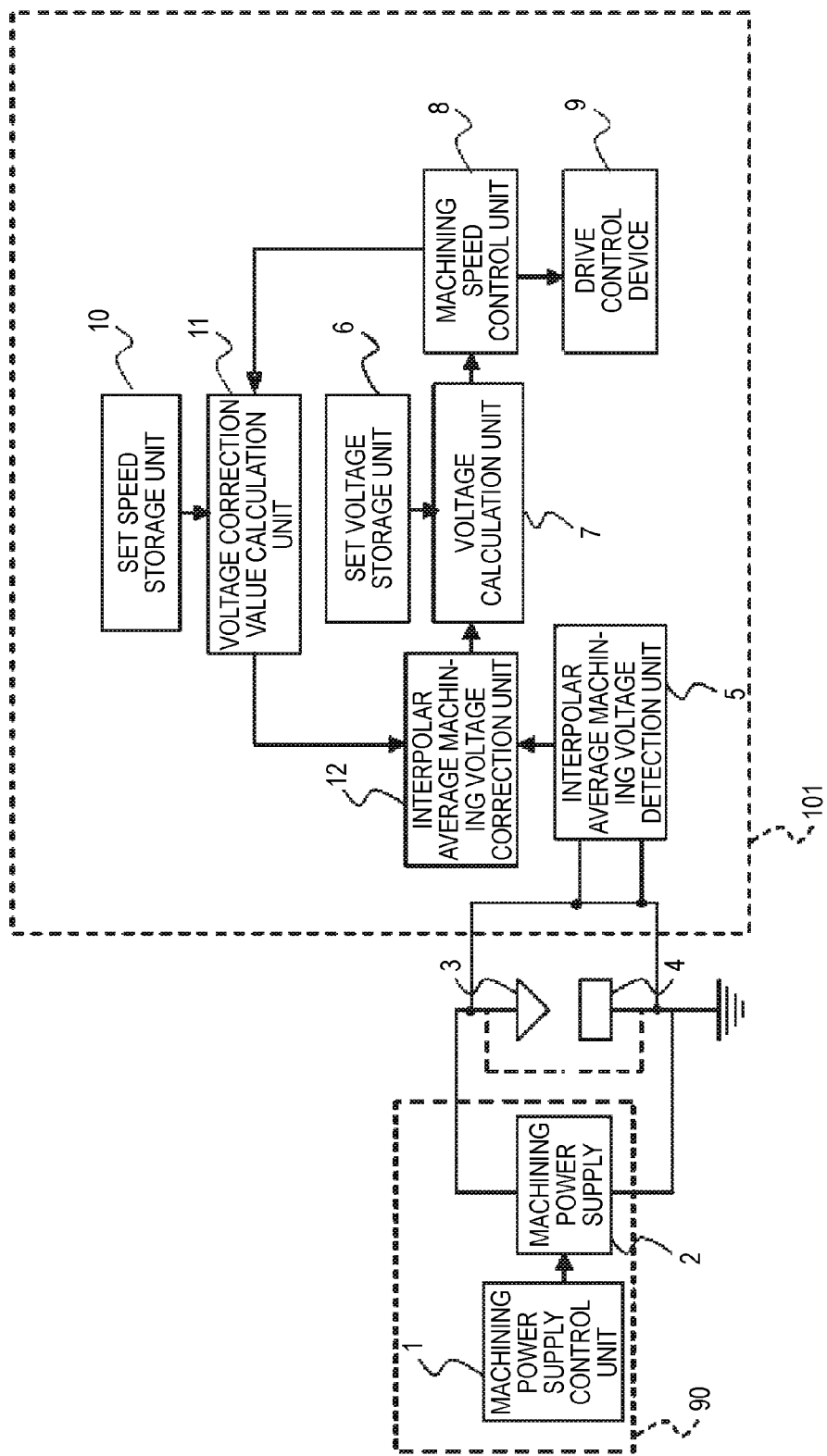
FIG. 3 A block diagram showing a wire discharge machine according to Embodiment 1 of the invention.

FIG. 3 is a block diagram showing a wire discharge machine according to Embodiment 1 of the invention. First, the wire discharge machine according to the invention is constituted by a machining electrode 3, a power supply unit 90, and a control unit 101. The power supply unit 90 is constituted by a machining power supply 2 for applying a voltage between the machining electrode 3 and a workpiece 4 to be machined, and a machining power supply control unit 1 for controlling ON/OFF of the machining power supply 2. The power supply unit 90 and details of a mechanical structure (the numbers and layout of switches, inductances, resistances and conductances on an electric circuit) are different from the gist of the invention. Therefore, the description of the power supply unit 90 and the details of the mechanical structure will be omitted here.

In the control unit 101, a machining speed (relative speed between the machining electrode 3 and the workpiece 4) is controlled from an interpolar average machining voltage between the machining electrode 3 and the workpiece 4. The control unit 101 is constituted by a set speed storage unit 10 for storing a set speed for machining at a predetermined machining speed, a voltage correction value calculation unit 11 and an interpolar average machining voltage correction unit 12 in addition to an interpolar average machining voltage detection unit 5 for detecting the interpolar average machining voltage, a voltage calculation unit 7 for calculating a difference between the measured interpolar average machining voltage and a set voltage, a set voltage storage unit 6 for storing the set voltage for machining with a predetermined average voltage, a machining speed control unit 8, and a drive control device 9.

Incidentally, the set speed storage unit 10, the voltage correction value calculation unit 11, and the interpolar average machining voltage correction unit 12 are newly proposed in the invention.

Figure 4:
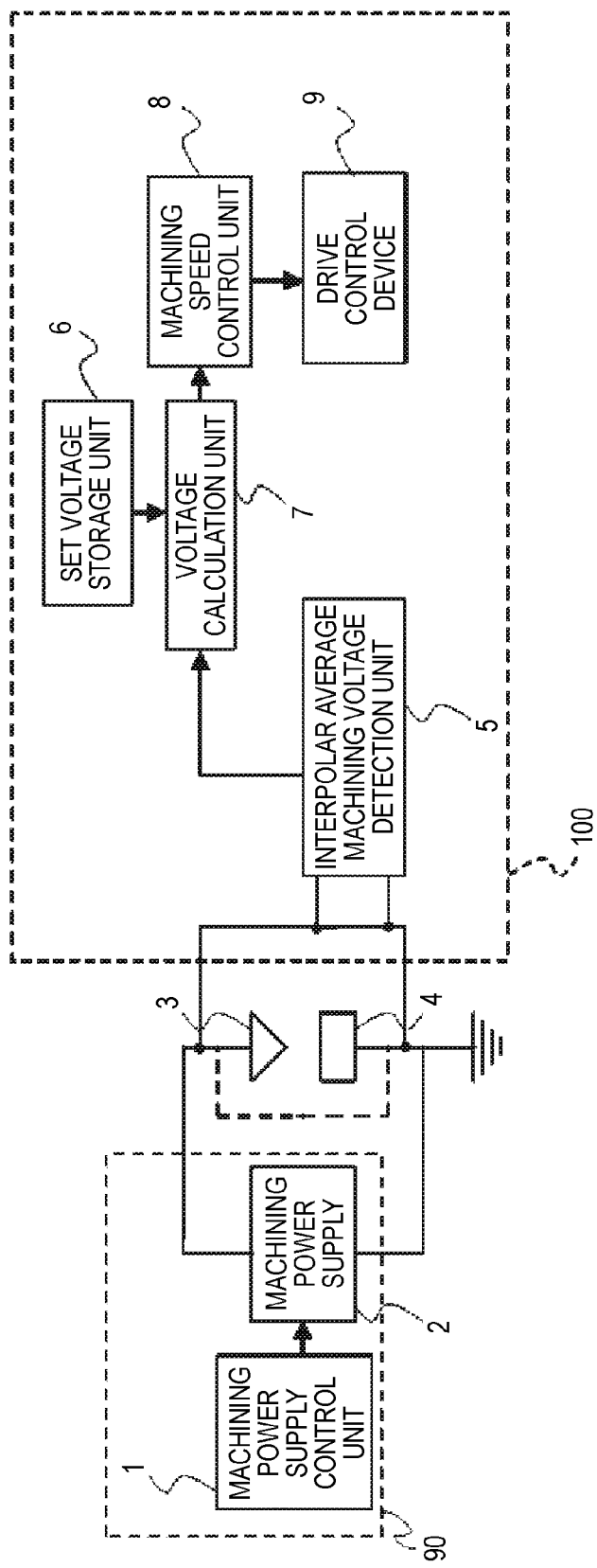
FIG. 4 A block diagram showing a wire discharge machine performing conventional control.

Here, description will be made about conventional control. FIG. 4 is a block diagram showing a wire discharge machine for performing conventional control. Constituent parts the same as those in FIG. 3 are referenced correspondingly. A conventional control unit 100 is constituted by an interpolar average machining voltage detection unit 5, a voltage calculation unit 7, a set voltage storage unit 6, a machining speed control unit 8, and a drive control device 9. Operation of control during machining in the conventional wire discharge machine will be described. A voltage is applied between poles from the power supply unit 90 in order to generate discharge continuously for machining. The interpolar average machining voltage detection unit 5 measures an interpolar average machining voltage at predetermined intervals of time. A discharge state such as a discharge frequency or a machining amount can be estimated from the interpolar average machining voltage measured at the predetermined intervals. As for the discharge frequency, the machining amount or the like, one regarded as suitable depends on machining conditions, so a suitable interpolar average machining voltage is determined depending on a purpose. In the set voltage storage unit 6, voltages regarded as suitable in accordance with purposes are set in advance as set voltages. The voltage calculation unit 7 calculates a difference between the measured interpolar average machining voltage and the set voltage. The machining speed control unit 8 calculates a machining speed (relative speed between the machining electrode 3 and the workpiece 4) so that the interpolar average machining voltage that will be measured within a predetermined time can reach the set voltage (so that the difference calculated by the voltage calculation unit 7 can reach 0). The drive control unit 9 controls the machining electrode 3 based on the machining speed calculated by the machining speed control unit 8.

Here, return to the description of the control unit 101 according to the embodiment. As is understood from comparison between FIG. 3 and FIG. 4, the voltage correction value calculation unit 11, the interpolar average machining voltage correction unit 12, and the set speed storage unit 10 are newly introduced into the wire discharge machine according to Embodiment 1 of the invention. The operation of the control unit 101 according to the embodiment will be described. The interpolar average machining voltage detection unit 5 detects an interpolar average machining voltage in the same manner as the conventional control unit 100, and outputs the measured interpolar average machining voltage to the interpolar average machining voltage correction unit 12, which will be described in detail later. The voltage calculation unit 7 calculates a difference between the output from the interpolar average machining voltage correction unit 12 and a set voltage stored in advance in the set voltage storage unit 6. The machining speed control unit 8 calculates a machining speed so that the difference calculated by the voltage calculation unit 7 can reach 0 in the same manner as in the conventional calculation method. The drive control unit 9 controls the machining electrode 3 based on the machining speed calculated machining speed control unit 8.

In addition, the following process is added to the conventional control unit 100.

The machining speed control unit 8 transmits the calculated machining speed to the voltage correction value calculation unit 11 in addition to the drive control device 9. The voltage correction value calculation unit 11 calculates a difference between a set speed stored in advance in the set speed storage unit 10 and the machining speed calculated by the machining speed control unit 8, and multiplies the difference by a correction coefficient to obtain an interpolar average machining voltage correction value. The interpolar average machining voltage correction unit 12 performs arithmetic operation on the interpolar average machining voltage from the interpolar average machining voltage detection value and the interpolar average machining voltage correction value 5 calculated by the voltage correction value calculation unit 11, and transmits a result of the arithmetic operation to the voltage calculation unit 7.

Incidentally, a method for controlling a machining speed in the machining speed control unit 8 in order to make the interpolar average machining voltage consistent with the set voltage is similar to the conventional method, and is not essential for the invention. For example, in the control method for making the interpolar average machining voltage consistent with the set voltage, a machining speed may be calculated based on an equation having only proportional terms, or an equation having differential/integral terms in addition to proportional terms, etc. Alternatively, optimum control may be used.

Figure 5:
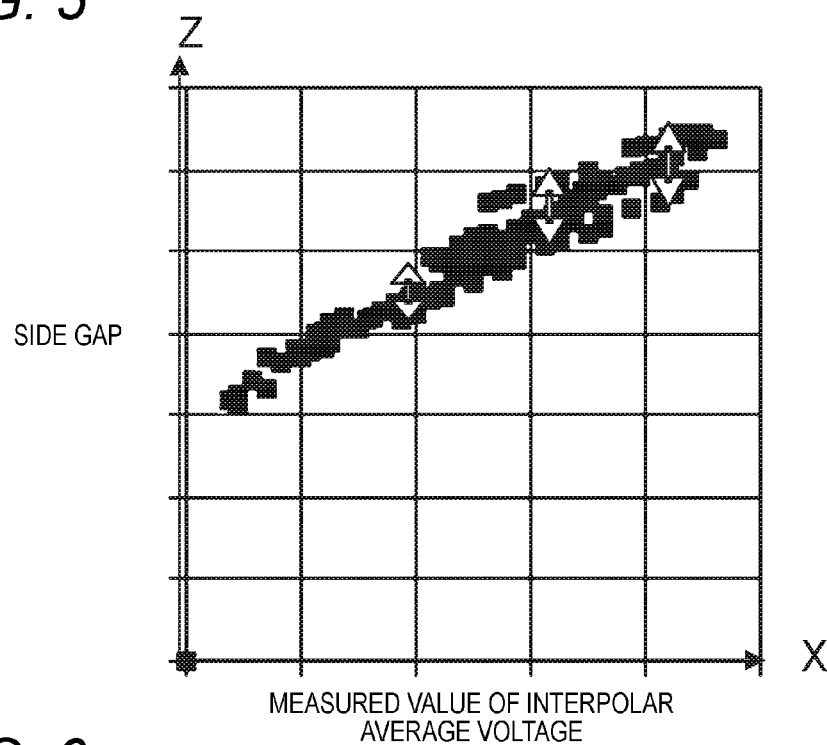
FIG. 5 A graph showing an example of the relationship between an interpolar average machining voltage measured during shape correction machining, and the side gap.
Figure 6:
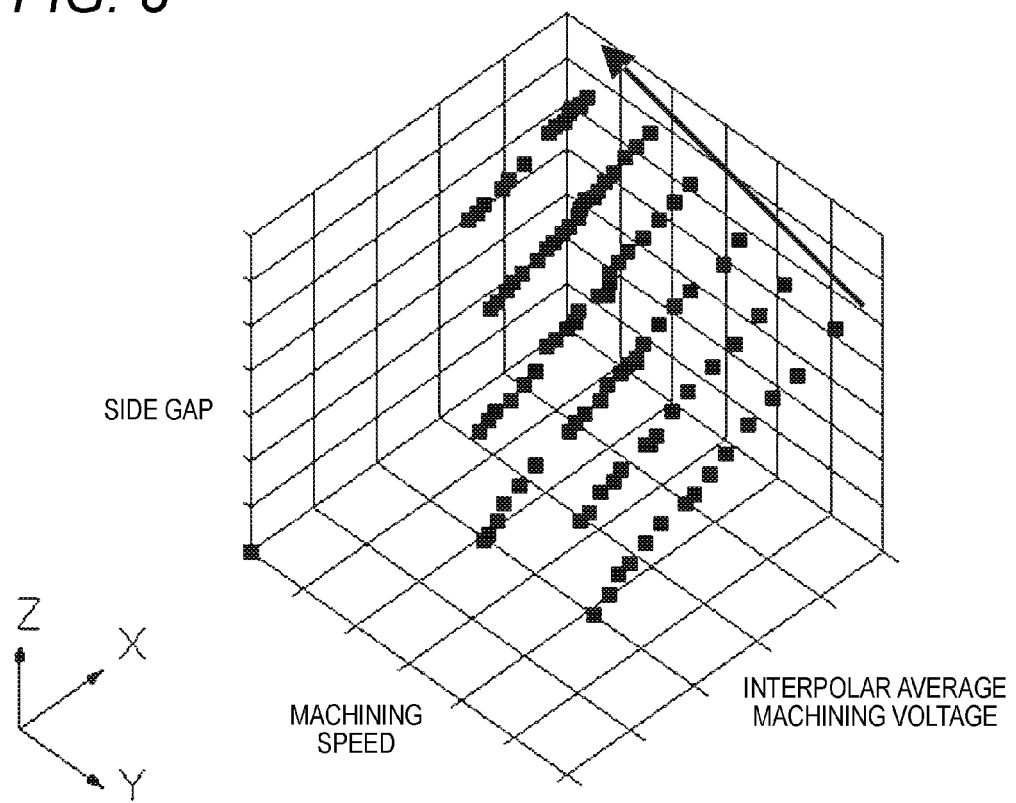
FIG. 6 A graph showing the relationship among the interpolar average machining voltage measured during shape correction machining, the machining speed, and the side gap.

Next, in the wire discharge machine according to Embodiment 1 of the invention, the interpolar average machining voltage is corrected in accordance with the machining speed. Experimental data underlying the correction are shown in FIG. 5 and FIG. 6. The data in FIG. 5 and FIG. 6 are data in which a workpiece of steel having a plate thickness of 60 mm was machined with a machining electrode having a diameter of φ0.2. FIG. 5 and FIG. 6 show the same data. FIG. 5 is expressed by the machining voltage and the side gap in FIG. 6. FIG. 5 shows an example of the relationship between the interpolar average machining voltage (X axis) and the side gap (Z axis). From FIG. 5, it is understood that the side gap is not constant even when the interpolar average machining voltage is constant. That is, it is understood that even if conventional control is carried out to make the interpolar average machining voltage consistent with the set voltage, the side gap cannot be made constant to such a level that accuracy required in the shape correction machining can be obtained.

In FIG. 6, an index of the machining speed is added to FIG. 5. FIG. 6 is a graph showing an example of the relationship among the interpolar average machining voltage (X axis), the machining speed (Y axis), and the side gap (Z axis). As shown in FIG. 6, the phenomenon that the side gap differs in spite of the same interpolar average machining voltage is closely related to the machining speed. Specifically, as the machining speed is slower, the side gap increases in spite of the same interpolar average machining voltage. That is, a control method in which the machining speed is taken into consideration other than the control in which the interpolar average machining voltage is made close to the set voltage is required in order to improve the accuracy in the shape correction machining, as shown in FIG. 5 and FIG. 6. Incidentally, it has been confirmed that the tendency (Expression (4), which will be described later) in FIG. 5 and FIG. 6 is not changed in spite of a change in machining conditions such as the diameter of the machining electrode, the workpiece to be machined, etc., as will be described in detail later.

When the correlation among the side gap, the interpolar average machining voltage and the machining speed is obtained by linear approximation from such a result of experiments, a relational expression in Expression (1) can be obtained. Here, SideGap designates a measured value of the side gap, FC designates a measured value of the machining speed, VG designates a measured value of the interpolar average machining voltage, and i designates the number of experimental data (i=1 ... N).

$$\text{SideGap}(i) = A \times FC(i) + B \times VG(i) + \text{Offset} \quad (1)$$

As expressed in Expression (1), the machining speed, the interpolar average machining voltage and the side gap are experimental values, each of which takes a different value from one point to another. On the other hand, A, B and Offset are fixed values. Based on Expression (1), a relational expression in Expression (2) can be obtained from a difference between (i)th experimental data and (i+1)th experimental data.

$$\text{SideGap}(i+1) - \text{SideGap}(i) = A \times (FC(i+1) - FC(i)) + B \times (VG(i+1) - VG(i)) \quad (2)$$

Sine a purpose is to make the side gap constant in the shape correction machining, the relationship between the machining speed and the interpolar average machining voltage under the same side gap can be obtained as Expression (3). Here, $\Delta FC$ designates a difference between an (i+1)th speed and an (i)th speed, and $\Delta VG$ designates a difference between an (i+1)th voltage and an (i)th voltage.

$$0 = A \times (FC(i+1) - FC(i)) + B \times (VG(i+1) - VG(i)) = A \times \Delta FC + B \times \Delta VG \quad (3)$$

It is understood that there is a relation of Expression (4) between the interpolar average machining voltage and the machining speed when the side gap is constant.

$$\Delta VG = -(A/B) \times \Delta FC \quad (4)$$

From the aforementioned analysis as to experiments of shape correction machining, it has been understood that the side gap varies not only in accordance with the interpolar average machining voltage but also in accordance with the machining speed, and the relational expression among them can be expressed as Expression (1). Based on the findings obtained thus, the interpolar average machining voltage needs be corrected in accordance with a change in machining speed as shown in the right side of Expression (4), in order to make the side gap constant.

Incidentally, in the embodiment, the left side of Expression (4) shows a difference from the set voltage stored in the set voltage storage unit 6, and the right side of Expression (4) shows a difference from the set speed stored in the set speed storage unit 10. In addition, although FIG. 5 and FIG. 6 show data in which the machining electrode diameter is BSφ0.2 and the workpiece is St60t, it has been experimentally confirmed that the relationship among the side gap, the machining speed and the interpolar average machining voltage satisfies Expression (4) on any machining conditions.

Accordingly, the set speed and the coefficient A/B may be determined in the system or set desirably in accordance with machining conditions on NC. Here, how to determine the set speed may be changed in accordance with machining conditions or may be set at a constant value. The set speed may be, for example, constantly set at 1.0 mm/min.

When the set speed is determined in the system, a table may be provided for setting different values in accordance with the diameter or material of the machining electrode, and the plate thickness or material of the workpiece. When the set speed is determined in accordance with machining conditions, the set speed may be set to a fixed value. A suitable method for determining the set speed may be used in accordance with required accuracy of shape correction.

The set speed and the coefficient shown here mean a gain and an offset. In the control method according to the invention, real-time correction is performed in accordance with a machining state based on a machining place and a direction to a machining advancement direction during each time of machining.

Figure 7:
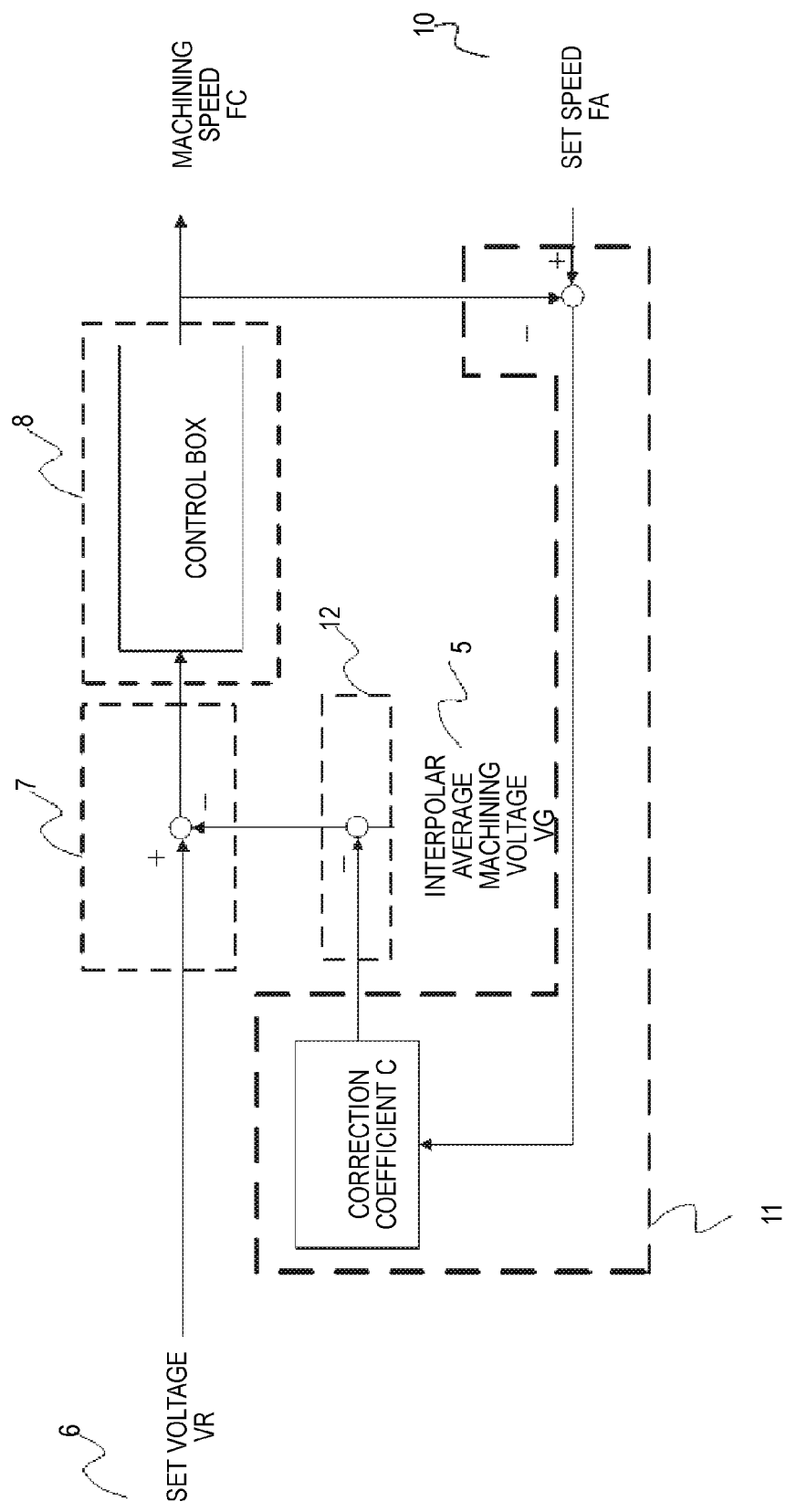
FIG. 7 A block diagram showing a process of control in the wire discharge machine according to Embodiment 1 of the invention.

Based on the relational expressions from Expression (1) to Expression (4), a process of control in the wire discharge machine according to Embodiment 1 of the invention is shown in FIG. 7. FIG. 7 shows control in which a control for making the interpolar average machining voltage consistent with the set voltage in the wire discharge machine performing conventional control of FIG. 4 serves as a basis, and voltage correction due to the machining speed in Expression (4) is calculated to the interpolar average machining voltage.

The set voltage VR is a set voltage set in advance in the set voltage storage unit 6 in FIG. 3. The interpolar average machining voltage VG is a measured value detected by the interpolar average machining voltage detection unit 5 in FIG. 3. The correction coefficient C is A/B in Expression (4). The machining speed FC is a machining speed outputted from the machining speed control unit 8 in FIG. 3.

Incidentally, here, the relationship between the power supply and the speed is expressed simply by a linear equation. However, in order to increase the accuracy, the dimension of the equation may be increased. Expression (4) can be expressed by the following high-dimensional expression.

$$\Delta VG = C_1 \times \Delta FC + C_2 \times \Delta FC^2 + C_3 \times \Delta FC^{3+} \quad (5)$$

$C_1$, $C_2$, $C_3$ . . . here are coefficients of respective dimensions. For example, the one-dimensional coefficient "–(A/B)" in Expression (4) corresponds to $C_1$. The invention is characterized in that a component of speed fluctuation is fed back to correct the voltage. Therefore, the component of speed fluctuation fed back may have any number of dimensions.

The process of FIG. 7 will be described below. First, a value obtained by multiplying a difference between the machining speed FC and the set speed FA by the correction coefficient C is subtracted from the value VG detected by the interpolar average machining voltage detection unit 5. A value obtained by the subtraction is subtracted from the set voltage VR, and conversion (control box) from the interpolar machining voltage to the machining speed FC is performed in the same manner as the conventional conversion. As also described in FIG. 3, since this conversion is not essential for the invention, explanation thereof is omitted. Using the machining speed FC calculated as a result of the conversion, the drive control device 9 in FIG. 3 performs drive control. The difference between the machining speed FC and the set speed FA is inputted to the voltage correction value calculation unit 11 in order to be multiplied by the correction coefficient C.

Figure 8:
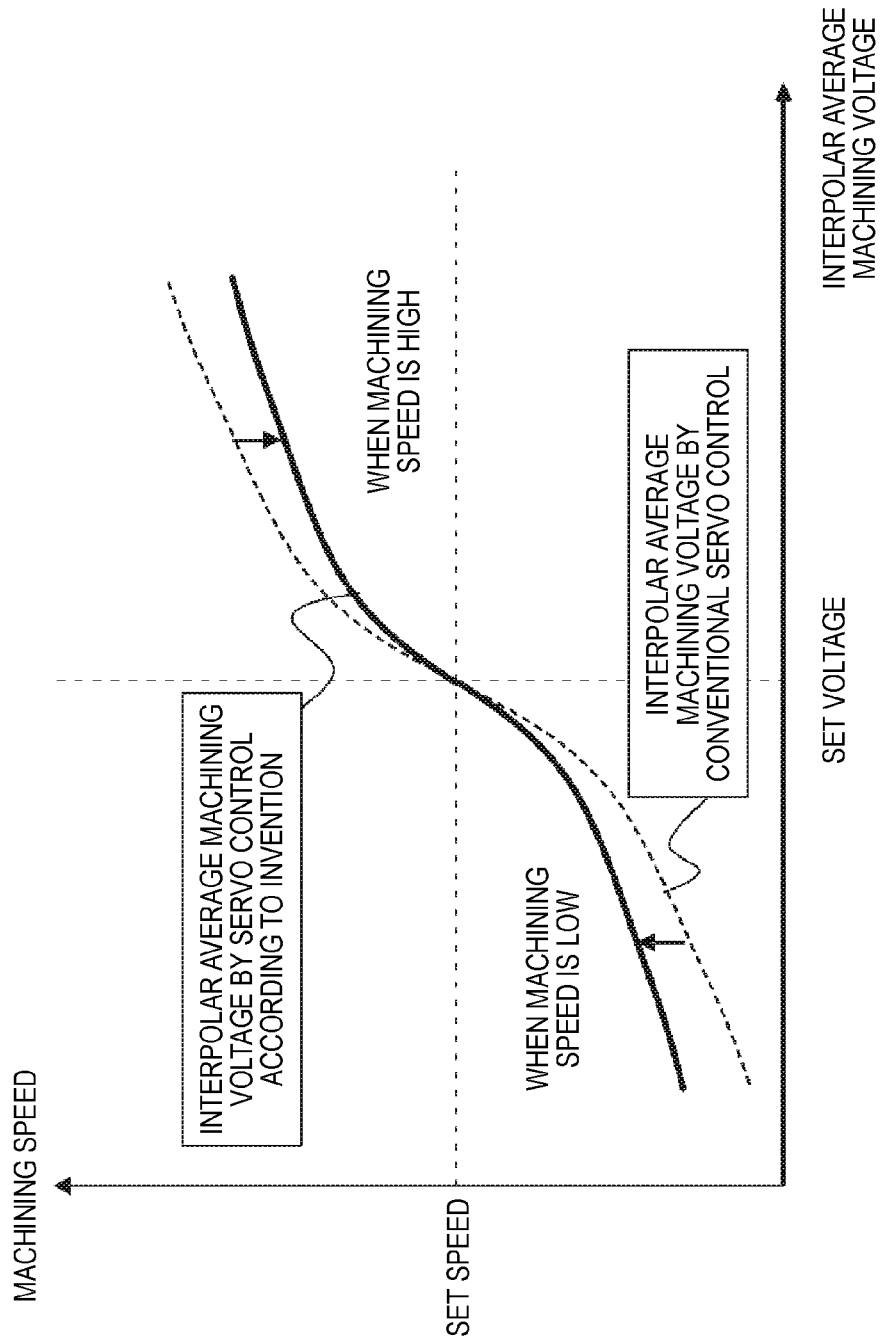
FIG. 8 A graph showing comparison between a machining speed by control in the wire discharge machine according to Embodiment 1 of the invention, and a machining speed by the conventional control.

FIG. 8 is a graph showing comparison between a machining speed by control in the wire discharge machine according to Embodiment 1 of the invention, and a machining speed by the conventional control. The abscissa designates the interpolar average machining voltage, and the ordinate designates the machining speed. The solid line is a graph of the control in the wire discharge machine according to Embodiment 1 of the invention, and the broken line is a graph of the conventional control. In each of the conventional control and the invention, the machining speed increases as the difference between the interpolar average machining voltage and the set voltage increases in the plus direction, and the machining speed decreases as the difference between the interpolar average machining voltage and the set voltage increases in the minus direction. In the invention, however, the interpolar average machining voltage is corrected by the difference between the machining speed and the set speed expressed by Expression (4) or (5). Therefore, the interpolar average machining voltage correction value increases in the minus direction as the machining speed increases. As a result, the machining speed is slower than that in the conventional control. On the contrary, the interpolar average machining voltage correction value increases in the plus direction as the machining speed decreases. As a result, the machining speed is faster than that in the conventional control.

In this manner, the interpolar average machining voltage is corrected in accordance with the difference between the machining speed and the set speed. It is therefore possible to deal with a variation in machining amount, while it is possible to suppress a variation in side gap caused by enlargement of a discharge gap. Thus, the machining accuracy in the shape correction machining can be improved.

Embodiment 2

Figure 9:
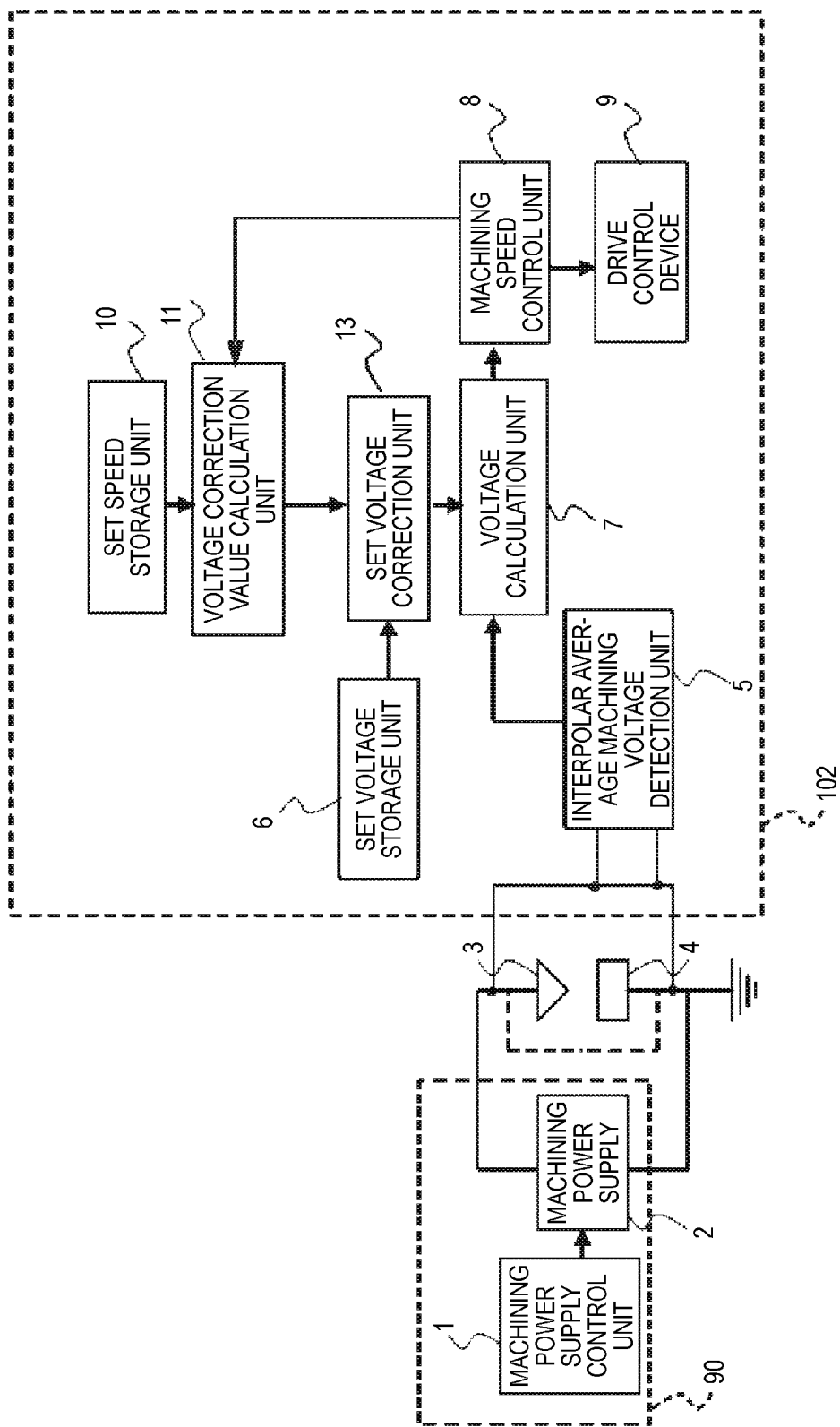
FIG. 9 A view showing a structure and a control configuration of a wire discharge machine according to Embodiment 2 of the invention.

FIG. 9 is a view showing a structure and a control configuration of a wire discharge machine according to Embodiment 2 of the invention. The technique presented in Embodiment 2 is characterized in that a voltage is corrected based on a machining speed in the same manner as in Embodiment 1. The different point from Embodiment 1 (FIG. 3) lies at a point that an interpolar average machining voltage correction value obtained by a machining speed is applied not to a voltage detected by the interpolar average machining voltage detection unit 5 but to a set voltage for correction.

FIG. 9 has a different portion from FIG. 3, at a point that a set voltage correction unit 13 is provided in place of the interpolar average machining voltage correction unit 12, and the voltage calculation unit 7 calculates a difference between a set voltage corrected by the set voltage correction unit 13 and the interpolar average machining voltage detected by the interpolar average machining voltage unit 5. Incidentally, portions the same as those in FIG. 3 are referenced correspondingly.

In the embodiment, in order to correct not the interpolar average machining voltage but the set voltage, the sign of expression is opposite to the sign of the correction expression for correcting the interpolar average machining voltage. That is, Expression (4) must be converted into the following Expression (6) for use in control.

$$\Delta VG' = (A/B) \times \Delta FC \quad (6)$$

Figure 10:
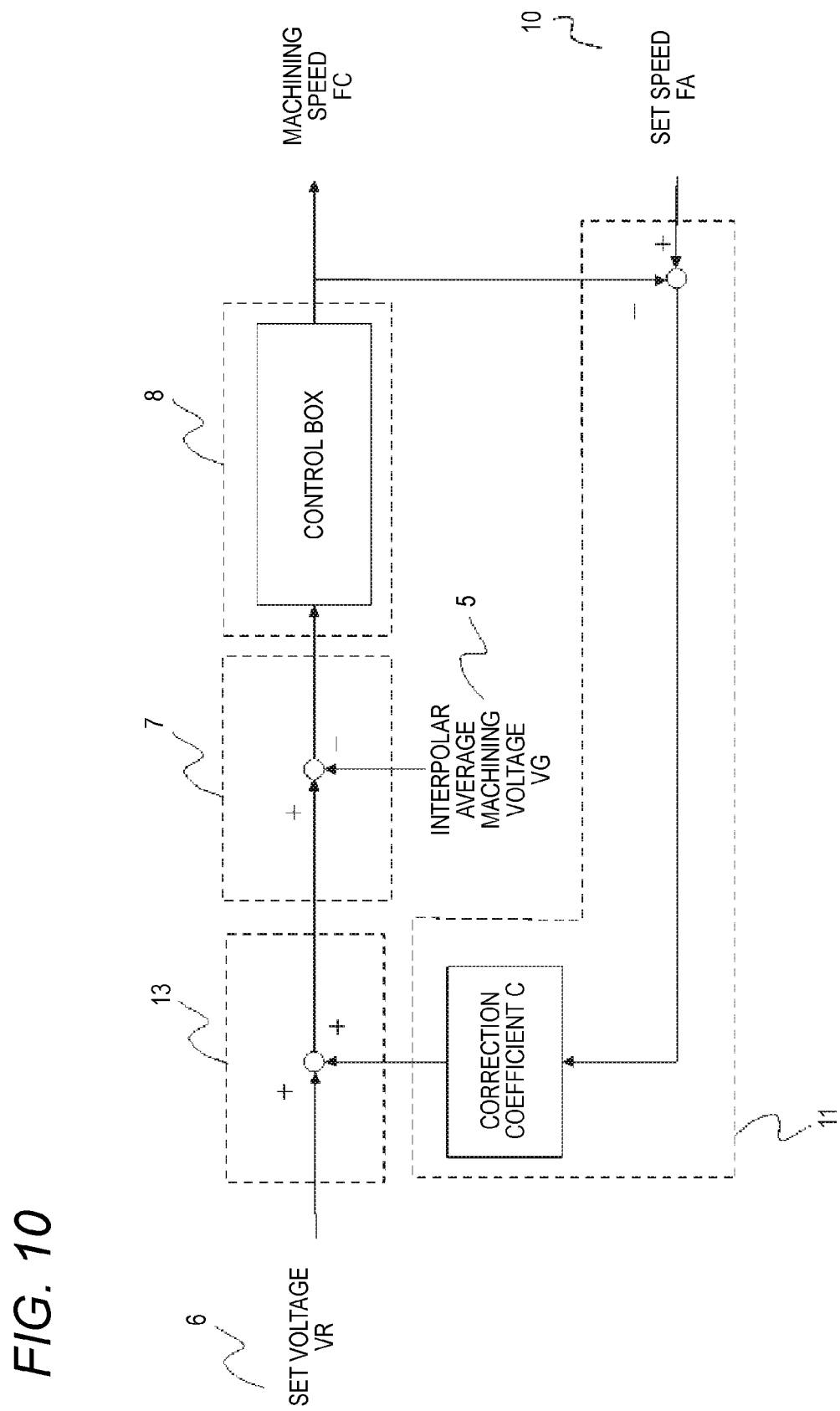
FIG. 10 A block diagram showing a process of control in the wire discharge machine according to Embodiment 2 of the invention.

FIG. 10 is a block diagram showing a process of control in the wire discharge machine according to Embodiment 2 of the invention. The difference from FIG. 7 is that a value obtained by multiplying a difference between the set speed FA and the machining speed FC by the correction coefficient C is subtracted from the set voltage VR. Subtraction of the correction value from the set voltage is performed in the set voltage correction unit 13 in FIG. 9. The other process is similar to that in FIG. 7 and description thereof will be omitted.

Figure 11:
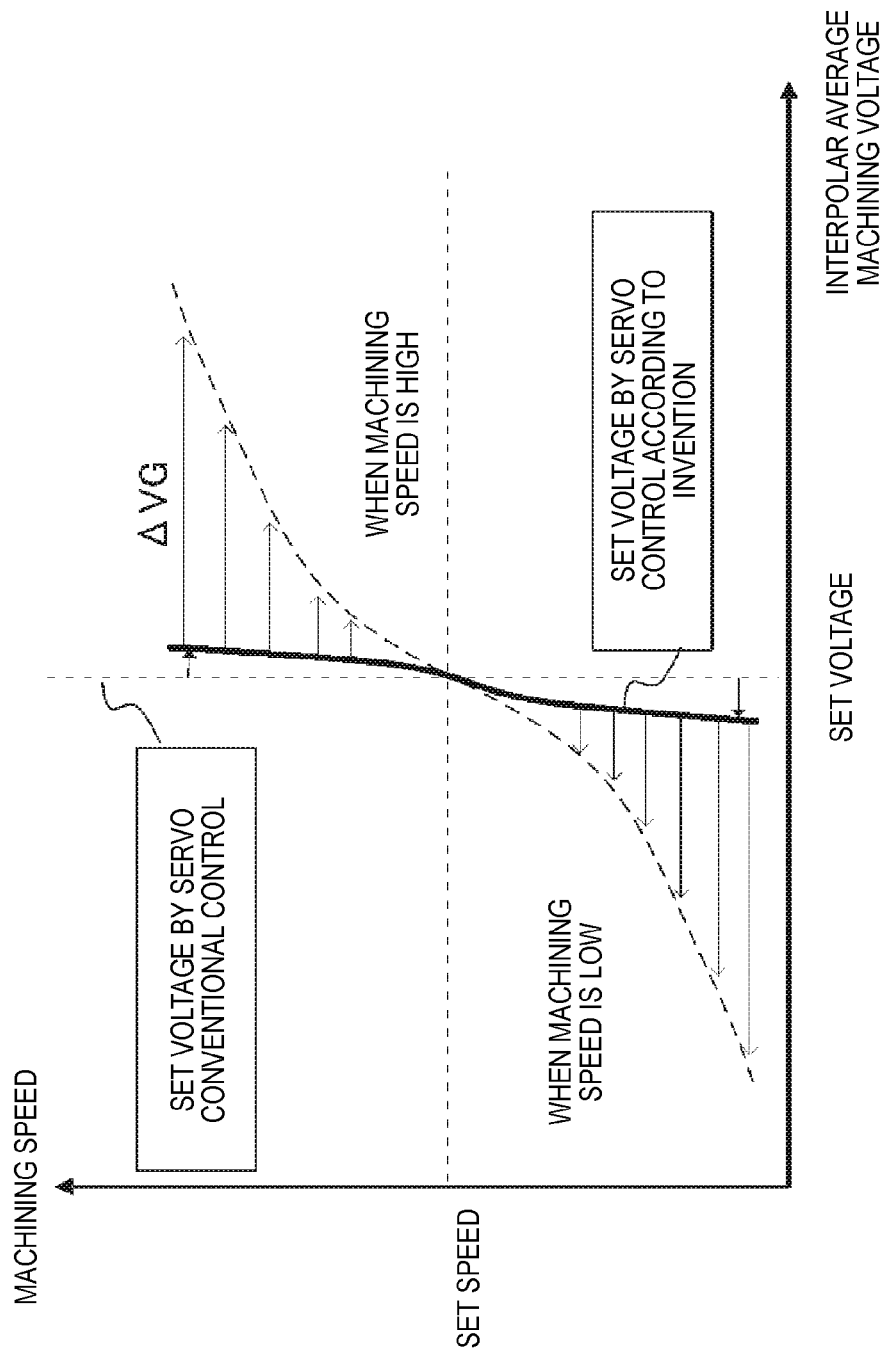
FIG. 11 A graph showing comparison between a machining speed by control in the wire discharge machine according to Embodiment 2 of the invention, and a machining speed by the conventional control.

FIG. 11 is a graph showing comparison between a machining speed by control in the wire discharge machine according to Embodiment 2, and a machining speed by the conventional control. The abscissa designates the interpolar average machining voltage, and the ordinate designates the machining speed. The broken line is a graph of the conventional control, and the solid line designates the set voltage by the control in Embodiment 2 of the invention. Same as in the Embodiment 1, the machining speed is controlled by the magnitude and sign of the difference between the interpolar average machining voltage and the set voltage. When the machining speed increases, the set voltage is corrected in the plus direction. Thus, the corrected set voltage becomes high. When the machining speed decreases, the set voltage is corrected in the minus direction. Thus, the corrected set voltage becomes low. In this manner, in Embodiment 2, $\Delta VG'$ is calculated using a result of the interpolar average machining voltage measured in the same manner as the conventional method, and the corrected set voltage. (Therefore, $\Delta VG'$ that is a difference between the interpolar average machining voltage and the set voltage in FIG. 10 is the same value as $\Delta VG$ in Embodiment 1, and a change in servo speed caused by the correction is also equivalent.)

As the effect of Embodiment 2, in the same manner as in Embodiment 1, machining in accordance with a required machining amount or enlargement of a discharge gap can be taken into consideration as a result of the correction of the set voltage based on the machining speed. Thus, the side gap can be made constant. That is, the machining accuracy in the shape correction machining can be improved.

Embodiment 3

Embodiment 3 has the structure of FIG. 3 in the same manner as in the wire discharge machine according to Embodiment 1. In Embodiment 1, the difference between the machining speed and the set speed is fed back to correct the interpolar average machining voltage when the machining speed is shifted from the set speed. On the other hand, in Embodiment 3, the interpolar average machining voltage is corrected when the difference between the machining speed and the set speed reaches a predetermined value after the machining speed is shifted to some extent.

Figure 12:
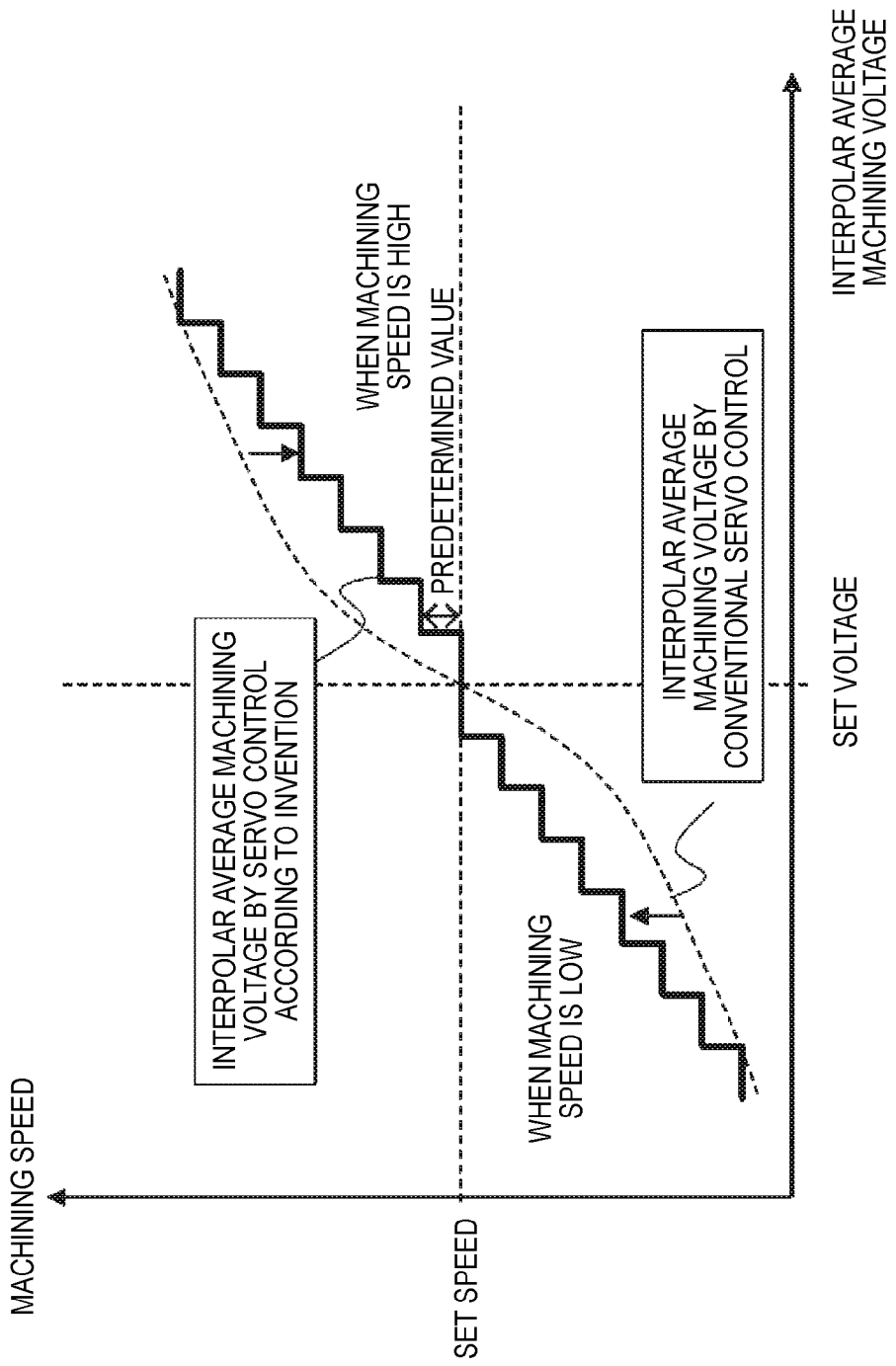
FIG. 12 A graph showing comparison between a machining speed by control in a wire discharge machine according to Embodiment 3 of the invention, and a machining speed by the conventional control.

FIG. 12 is a graph showing comparison between a machining speed by control in a wire discharge machine according to Embodiment 3, and a machining speed by the conventional control. The broken line designates the interpolar average machining voltage by the conventional control, and the solid line designates the interpolar average machining voltage by the embodiment. For example, assume that the set machining speed is 6.0 mm/min, and the predetermined value is 1.0 mm/min. In this case, normal control is carried out when the machining speed calculated from the difference between the interpolar voltage and the set voltage is 6.1 mm/min, 6.2 mm/min . . . 6.9 mm/min. However, when the machining speed reaches 7.0 mm/min, the interpolar average machining voltage is corrected with a value obtained by multiplying (7.0–6.0) mm/min by a correction coefficient, and control is carried out using the interpolar average machining voltage corrected newly. The value (7.0–6.0) mm/min is a difference from the set machining speed. Even when the machining speed is slower than the set machining speed, the interpolar average machining voltage is not corrected until the difference of the machining speed is larger than a predetermined value in the same manner. When the difference of the machining speed is larger, the interpolar average machining voltage is corrected.

In the embodiment, even when the machining voltage fluctuates suddenly due to roughness in the surface machined by the last machining, a certain degree of fluctuation caused by the roughness in the machined surface is dealt with by the interpolar average machining voltage in the step of machining for shape correction. When the machining amount of the machined surface fluctuates on average, the interpolar average machining voltage can be corrected so that machining can be carried out with a constant side gap.

Incidentally, in the voltage correction value calculation unit 11 in FIG. 3, the interpolar average machining voltage correction value may be set at 0 and outputted to the interpolar average machining voltage correction unit 12 until the difference of the machining speed is larger than the predetermined value. Alternatively, calculation of the difference from the interpolar average machining voltage in the interpolar average machining voltage correction unit 12 may be prevented until the difference of the machining speed is larger than the predetermined value.

Here, a table of correction coefficients corresponding to each absolute value of the difference of the machining speed may be provided in advance so that the correction coefficient can be changed in accordance with the absolute value. In this manner, the effect of improving the accuracy of shape correction can be enhanced in comparison with that when the correction coefficient is constant.

Embodiment 4

Figure 13:
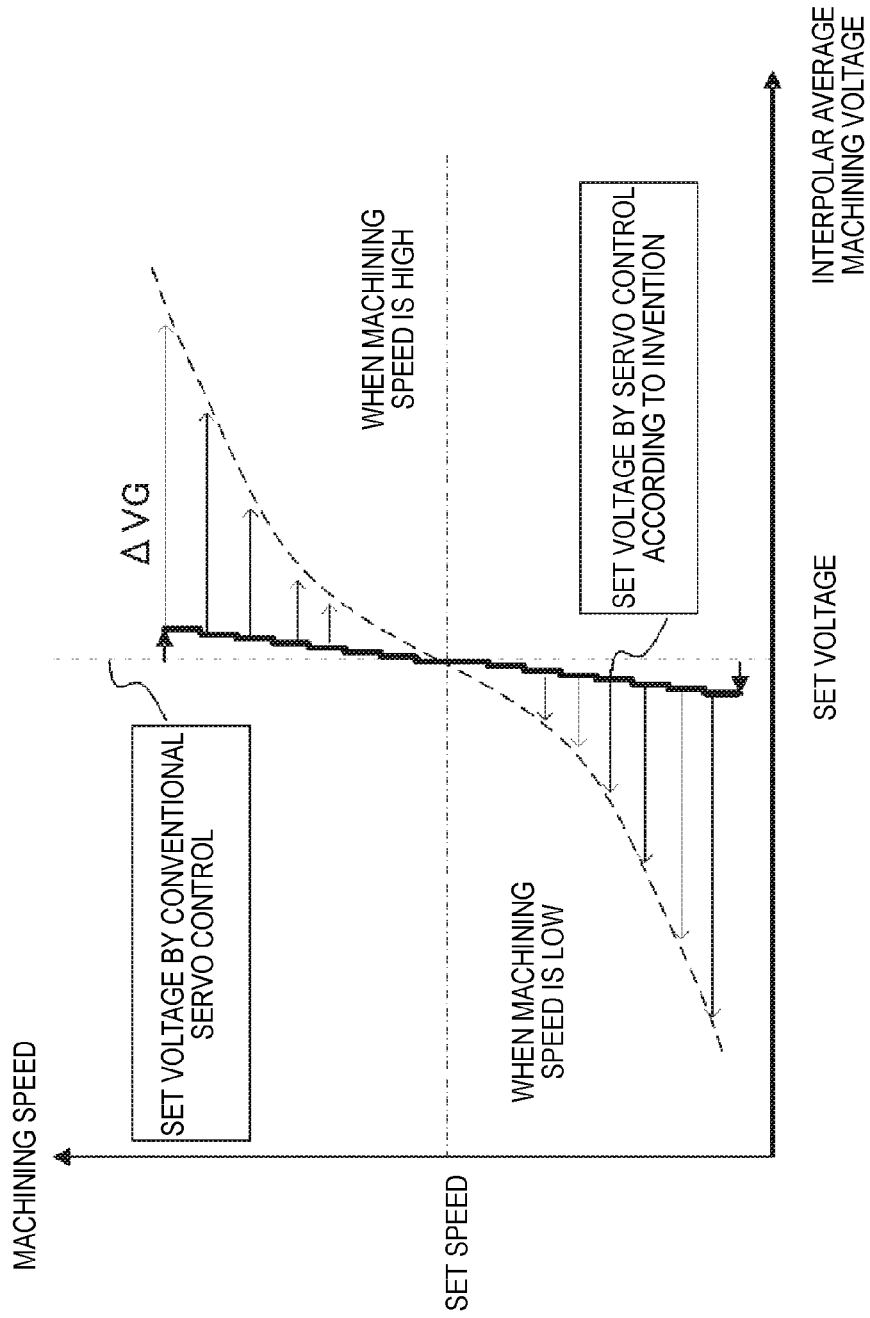
FIG. 13 A graph showing comparison between a machining speed by control in a wire discharge machine according to Embodiment 4 of the invention, and a machining speed by the conventional control.

Embodiment 4 has the structure of FIG. 9 in the same manner as the wire discharge machine according to Embodiment 2. In Embodiment 4, the set value is corrected in the same manner as in Embodiment 3. That is, when the difference between the machining speed and the set machining speed calculated by the difference between the interpolar average machining voltage and the set voltage reaches a certain degree or higher, the set voltage is corrected, and control for determining a machining speed from the difference from the interpolar average machining voltage is carried out based on the voltage corrected newly. FIG. 13 is a graph showing comparison between a machining speed by control in a wire discharge machine according to Embodiment 4, and a machining speed by the conventional control. The line with x=set voltage designates the interpolar average machining voltage by the conventional control, and the solid line designates the set voltage by the embodiment.

In this case, in the step of machining for shape correction, even when the machining voltage fluctuates suddenly due to roughness in the surface machined by the last machining, a certain degree of fluctuation caused by the roughness in the machined surface is dealt with by the interpolar average machining voltage, in the same manner as in Embodiment 3. When the machining amount of the machined surface fluctuates on average, the interpolar average machining voltage can be corrected so that machining can be carried out with a constant side gap.

Incidentally, in Embodiment 4, a table of correction coefficients corresponding to each absolute value of the difference of the machining speed may be provided in advance so that the correction coefficient can be changed in accordance with the absolute value, in the same manner as in Embodiment 3. In this manner, the effect of improving the accuracy of shape correction can be enhanced in comparison with that when the correction coefficient is constant.

DESCRIPTION OF REFERENCE NUMERALS AND SIGNS

3 Electrode
4 Workpiece to be machined
5 Interpolar average machining voltage detection unit
6 Set voltage storage unit
7 Voltage calculation unit
8 Machining speed control unit
9 Drive control device
10 Set speed storage unit
11 Voltage correction value calculation unit
12 Interpolar average machining voltage correction unit

The invention claimed is:

1. A control device for a wire discharge machine configured to apply a voltage between an electrode and a workpiece to be machined, to thereby generate discharge for machining the workpiece, the control device for the wire discharge machine comprising:
   an interpolar average machining voltage detection unit that detects an interpolar average machining voltage between the electrode and the workpiece;
   an interpolar average machining voltage correction unit that corrects the detected interpolar average machining voltage;
   a set voltage storage unit that stores, in advance, a set voltage as a target value of the interpolar average machining voltage;
   a voltage calculation unit that calculates a first difference between the set voltage and the corrected interpolar average machining voltage which is output by the interpolar average machining voltage correction unit;
   a machining speed control unit that calculates a machining speed of the electrode based on the first difference;
   a drive control device that controls a machining speed of the electrode in accordance with the calculated machining speed;
   a set speed storage unit that sets, in advance, a set speed as a target value of the machining speed; and a voltage correction value calculation unit that calculates an interpolar average machining voltage correction value based on a second difference between the calculated machining speed and the set speed, wherein the interpolar average machining voltage correction unit corrects the detected interpolar average machining voltage in accordance with the interpolar average machining voltage correction value.

2. A control device for a wire discharge machine configured to apply a voltage between poles made of an electrode and a workpiece to be machined, to thereby generate discharge for machining the workpiece, the control device for the wire discharge machine comprising:

an interpolar average machining voltage detection unit that detects an interpolar average machining voltage between the electrode and the workpiece;

a set voltage storage unit that stores, in advance, a set voltage as a target value of the interpolar average machining voltage;

a set voltage correction unit that corrects the set voltage;

a voltage calculation unit that calculates a first difference between the detected interpolar average machining voltage and the corrected set voltage which is output by the set voltage correction unit;

a machining speed control unit that calculates a machining speed of the electrode based on the first difference;

a drive control device that controls a machining speed of the electrode in accordance with the calculated machining speed;

a set speed storage unit that sets, in advance, a set speed as a target value of the machining speed; and a voltage correction value calculation unit that calculates an interpolar average machining voltage correction value based on a second difference between the calculated machining speed and the set speed, wherein the set voltage correction unit corrects the set voltage in accordance with the interpolar average machining voltage correction value.

3. The control device for a wire discharge machine according to claim 1, wherein the voltage correction value calculation unit calculates the interpolar average machining voltage correction value by multiplying the second difference between the calculated machining speed and the set speed by a correction coefficient that is a constant or a value corresponding to a machining condition.

4. The control device for the wire discharge machine according to claim 1, wherein a corrected value of the interpolar average machining voltage is a constant when the second difference between the calculated machining speed and the set speed is within a range set in advance.

5. The control device for the wire discharge machine according to claim 2, wherein a corrected value of the set voltage is a constant when the second difference between the calculated machining speed and the set speed is within a range set in advance.

6. The control device for a wire discharge machine according to claim 2, wherein the voltage correction value calculation unit calculates the interpolar average machining voltage correction value by multiplying the second difference between the calculated machining speed and the set speed by a correction coefficient that is a constant or a value corresponding to a machining condition.

7. The control device for the wire discharge machine according to claim 1, wherein the machining speed control unit provides the calculated machining speed as a feedback value to the voltage correction value calculation unit which subtracts the calculated machining speed from the set speed to derive the second difference and multiplies the second difference by a correction coefficient to derive the interpolar average machining voltage correction value.

* * * * *